US012693937B2

(12) United States Patent
Rajimwale et al.

(10) Patent No.: US 12,693,937 B2
(45) Date of Patent: Jul. 28, 2026

(54) LOW-LATENCY HARDWARE ACCELERATOR AND PERSISTENT MEMORY FOR INLINE DEDUPLICATION SYSTEMS

(71) Applicant: Dell Products L.P., Round Rock, TX (US)

(72) Inventors: Abhishek Rajimwale, San Jose, CA (US); Colin Zou, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 13 days.

(21) Appl. No.: 18/776,543

(22) Filed: Jul. 18, 2024

(65) Prior Publication Data

US 2026/0023655 A1 Jan. 22, 2026

(51) Int. Cl.
G06F 11/1446 (2026.01)

(52) U.S. Cl.
CPC ...... G06F 11/1453 (2013.01); G06F 11/1461 (2013.01)

(58) Field of Classification Search
CPC .......................... G06F 11/1453; G06F 11/1461
USPC .......................................................... 714/6.3
See application file for complete search history.

(56) References Cited

U.S. PATENT DOCUMENTS

2016/0364145 A1* 12/2016 Smith ..................... G06F 3/067
2022/0342758 A1* 10/2022 Tal .......................... G06F 3/067

* cited by examiner

*Primary Examiner* — Yair Leibovich
(74) *Attorney, Agent, or Firm* — Dergosits & Noah LLP; Todd A. Noah

(57) ABSTRACT

A processor that executes an inline deduplication pipeline identifies any data segment which is created from data received with a write request from a client, and which is unique relative to data segments stored by the inline deduplication pipeline. The processor logs any segment reference of any data segment which is identified as unique, and any data received from the client and yet to be anchored into any data segment, into persistent memory, which has a lower write latency than any non-volatile random-access memory device that is external to the persistent memory. A hardware accelerator, which has a lower compression latency than the processor, compresses any data segment identified as unique, and stores any compressed data segments into the persistent memory. The client is enabled to provide additional data by the processor acknowledging to the client that the data received from the client is stable in the persistent memory.

20 Claims, 7 Drawing Sheets

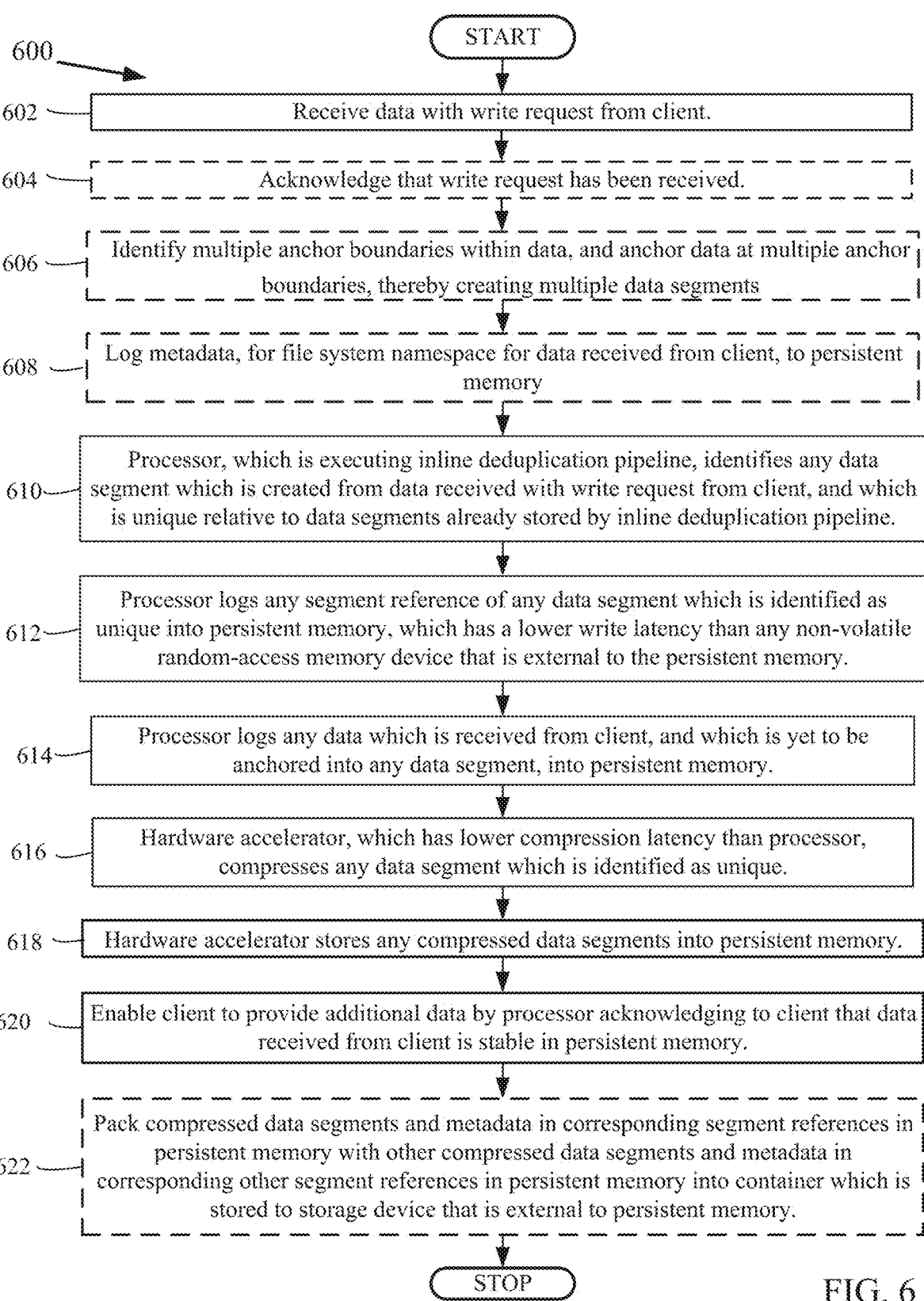

600

START

602 — Receive data with write request from client.

604 — Acknowledge that write request has been received.

606 — Identify multiple anchor boundaries within data, and anchor data at multiple anchor boundaries, thereby creating multiple data segments 608 — Log metadata, for file system namespace for data received from client, to persistent memory 610 — Processor, which is executing inline deduplication pipeline, identifies any data segment which is created from data received with write request from client, and which is unique relative to data segments already stored by inline deduplication pipeline.

612 — Processor logs any segment reference of any data segment which is identified as unique into persistent memory, which has a lower write latency than any non-volatile random-access memory device that is external to the persistent memory.

614 — Processor logs any data which is received from client, and which is yet to be anchored into any data segment, into persistent memory.

616 — Hardware accelerator, which has lower compression latency than processor, compresses any data segment which is identified as unique.

618 — Hardware accelerator stores any compressed data segments into persistent memory.

620 — Enable client to provide additional data by processor acknowledging to client that data received from client is stable in persistent memory.

622 — Pack compressed data segments and metadata in corresponding segment references in persistent memory with other compressed data segments and metadata in corresponding other segment references in persistent memory into container which is stored to storage device that is external to persistent memory.

STOP

FIG. 6

LOW-LATENCY HARDWARE ACCELERATOR AND PERSISTENT MEMORY FOR INLINE DEDUPLICATION SYSTEMS

TECHNICAL FIELD

This disclosure relates to storing digital information, and more particularly, to a low-latency hardware accelerator and persistent memory for inline deduplication systems.

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated files which may be referred to as backups. When the data protection administrator decides to reinstate the data object to a previous state, the data protection administrator specifies the desired previous state by identifying a desired time when the data object was in this previous state, and then instructs the backup/restore application to execute a restore operation to restore a copy of the corresponding backup(s) for that previous state to the data object.

A data user may copy data in a data center to one or more remote sites, which may be in one or more cloud locations, to have copies of the data available in case of a data center disaster, and/or the data user may copy data from remote sites to a centralized data center. Data storage systems include recording media that retain digital information, have evolved towards scalable designs that can grow with customer demand by adding storage and computation as necessary, and typically store redundant information. For example, when creating a copy of an enterprise's email system data which includes 100 instances of the same 1 Megabyte (MB) data file attachment, a data storage system may store all 100 instances of the same 1 MB data file attachment, inefficiently using 100 MB of storage space to store the same 1 MB data file attachment. Data deduplication can eliminate redundant copies of information, which can improve the utilization of data storage systems and lower capital expenditure by reducing the total amount of recording media required to meet the capacity needs of data storage systems. Continuing the previous example, a data deduplication system stores only one instance of the same 1 MB data file attachment and stores small references to the one stored instance for the 99 subsequent instances.

When being copied from or to a data storage system, a data file or a data object may be divided into data file segments. A data deduplication system can receive data file segments, compare these received data file segments against previously stored data file segments, identify which received data file segments are unique because they have not been previously stored, and store the unique data file segments. When a comparison identifies a received data file segment as a duplicate of a data file segment that has previously been stored as unique, a data deduplication system replaces the duplicate data file segment with a small reference that points to the previously stored data file segment.

A deduplication system typically does not determine whether any such data file segment is a duplicate data file segment or a unique data file segment by directly comparing this data file segment against previously stored data file segments which were previously determined to be unique data file segments. For example, a deduplication system would waste system resources by directly comparing thousands of bytes in each of many data file segments which were formed from a client's data object or data file against hundreds of bytes in millions of data file segments which have already been identified and stored as unique data file segments. Instead, a fingerprint, may be generated to uniquely identify each data file segment, such as by applying a SHA-1 hash function to create a unique 20-byte fingerprint for each data file segment. Consequently, a deduplication system can conserve system resources by more efficiently comparing 20-byte fingerprints for each of many data file segments formed from a client's data object or data file against 20-byte fingerprints for millions of data file segments which have already been identified and stored as unique data file segments.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 6 is a block diagram illustrating an example method for a low-latency hardware accelerator and persistent memory for inline deduplication systems, according to one or more embodiments of the disclosure.

DETAILED DESCRIPTION

Persistent memory, which has been around for several years in the computer industry, combines the low-latency properties of the fast access by dynamic random-access memory (DRAM) with the ability to retain data in case of power loss, and has been used in several applications and systems either as a new tier of storage or as a faster persistent media itself. For example, persistent memory has been used for caching, write-buffering and acceleration to store frequently accessed data, journaling in databases and file systems, storing data for real-time analysis by artificial intelligence (AI), data storage for critical data such as user sessions, and general-purpose high-performance storage media. In large-scale deduplication-based systems and applications, persistent memory has been used as a storage media for fingerprints for fast on-disk fingerprint lookup or for logging clients' data, which is later deduplicated and stored in other lower cost persistent media. Efficient, memory-like access is the defining characteristic of persistent memory, which may be provided using microprocessor memory instructions, such as load and store, or using application programming interfaces (APIs) that implement remote direct memory access (RDMA) actions, such as RDMA read and RDMA write.

Figure 1:
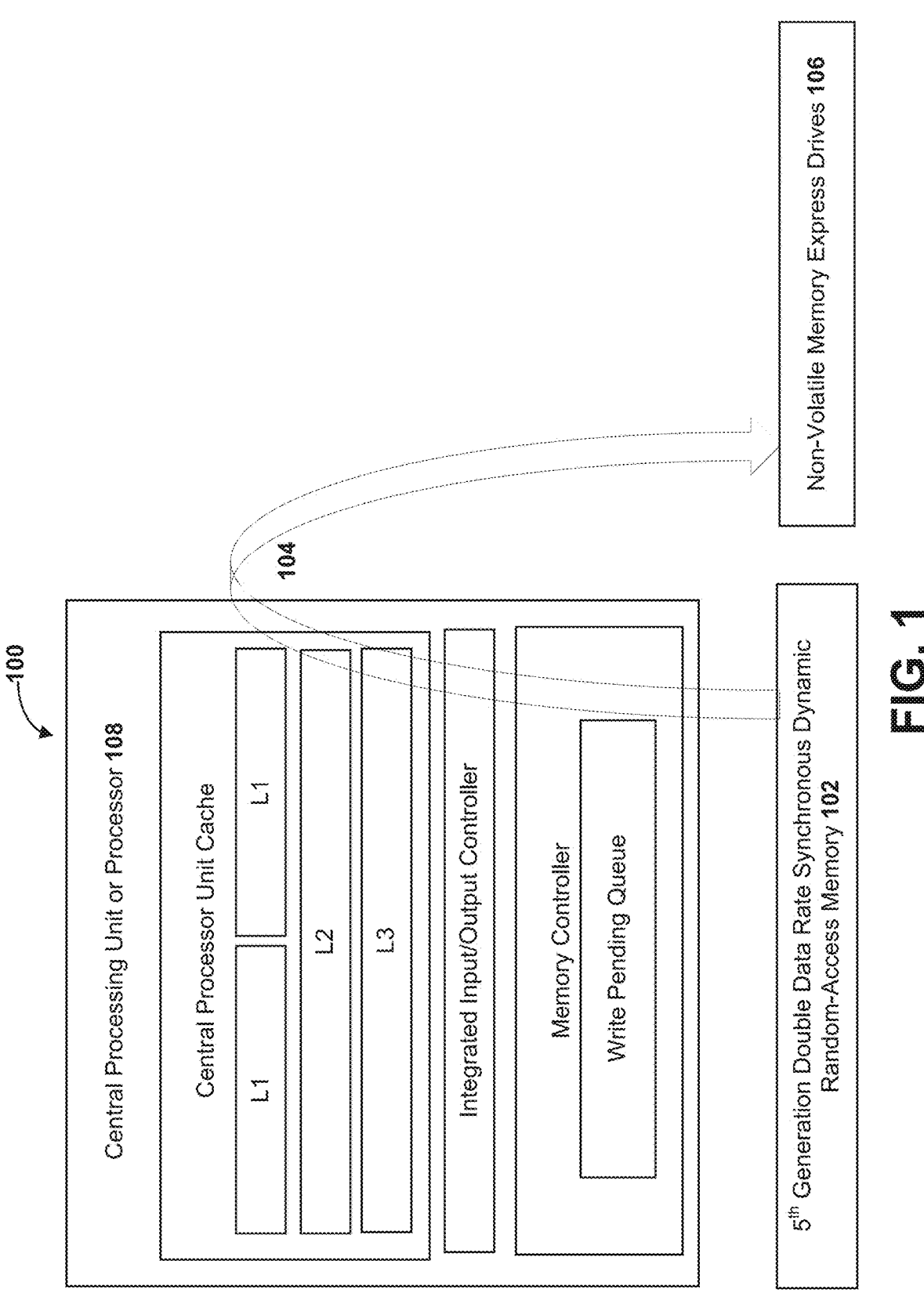
FIG. 1 is a block diagram illustrating low-latency persistent memory for inline deduplication systems, according to one or more embodiments of the disclosure.

Focused on 16G PE Intel based platforms, Dell's software-defined persistent memory (SDPM) is a low-cost persistent memory solution that is designed within Dell for storage appliances using PowerEdge Leveraged Platforms. FIG. 1 depicts a system 100 that includes example components involved in the software-defined persistent memory hardware solution. The high-level design for persistence is based on dedicating a portion of memory, such as a part 102 of a fifth-generation double data rate synchronous dynamic random-access memory technology, to be used as persistent memory 102. On power loss 104, data is copied by a basic input/output system (BIOS) from the dedicated persistent memory 102 to non-volatile random-access memory, such as M.2 Non-Volatile Memory Express (NVMe) drives 106. On reset, a power supply unit provides the electrical power to copy the data back from the non-volatile random-access memory drive 106 to the persistent memory 102.

Also characterized by low-latency, a hardware accelerator is designed to perform specific functions more efficiently when compared to software running on a general-purpose central processing unit (CPU), or processor 108. Any transformation of data that may be calculated in software running on a generic CPU can also be calculated in custom-made hardware, or in some combination of both software and hardware. Advantages of focusing on hardware to perform computing tasks more efficiently may include speedup, reduced power consumption, lower latency access, increased parallelism and bandwidth, performance using optimized data processing and concurrency, and better utilization of area and functional components available on an integrated circuit. The costs of focusing on hardware include the lower ability to update designs once etched into silicon and higher expenses of functional verification, time to market, and the need for more parts. Hardware acceleration is advantageous for performance, and practical when the accelerated functions are fixed so updates are not as needed as in software solutions.

Hardware acceleration is often employed for any computation-intensive algorithm which includes repetitive, fixed tasks that are executed frequently in a program on large amounts of data and that involve little conditional branching. The hardware that performs the acceleration may be part of a general-purpose CPU, or a separate unit called a hardware accelerator, though they are usually referred with a more specific term, such as a 3-D accelerator or a cryptographic accelerator. On-chip hardware accelerators have been used for decades, starting from co-processors floating point arithmetic, graphics processing unit (GPUs), digital signal processors (DSPs), and more recently accelerators for artificial intelligence and neural networks processing. Depending upon the granularity, hardware acceleration can vary from a small functional unit to a large functional block, such as motion estimation in MPEG2.

Intel QAT is an established technology previously implemented in networking systems on a chip, in Intel Xeon processor chipsets, and as a standalone accelerator device and peripheral component interconnect express (PCI Express) adapter card. Intel QAT is now available as an integrated, built-in accelerator on the latest 4th and 5th generation Intel Xeon processors. This innovative technology offloads computationally intensive symmetric and asymmetric cryptography and data compression/decompression operations from the CPU or processor 108, relieving the CPU or processor 108 from these demanding tasks. This reallocation of computational resources allows the CPU or processor 108 to perform other tasks more efficiently, potentially enhancing overall system performance, efficiency, and power across various use cases.

In some embodiments, a system (and a computer program product and a method) is described for a low-latency hardware accelerator and persistent memory for inline deduplication systems. A processor that executes an inline deduplication pipeline identifies any data segment which is created from data received with a write request from a client, and which is unique relative to data segments already stored by the inline deduplication pipeline. The processor logs any segment reference of any data segment which is identified as unique into persistent memory, which has a lower write latency than any non-volatile random-access memory device that is external to the persistent memory. The processor logs any data which is received from the client and which is yet to be anchored into any data segment into the persistent memory. A hardware accelerator, which has a lower compression latency than the processor, compresses any data segment which is identified as unique. The hardware accelerator stores any compressed data segments into the persistent memory. The client is enabled to provide additional data by the processor acknowledging to the client that the data received from the client is stable in the persistent memory.

For example, a processor receives a part of a database file being currently copied from a client, identifies anchor boundaries for creating data segments numbered 1 to 95, and then executes phases of an inline deduplication pipeline, which determines that the data segments numbered 2-7, 11-13, and 17-19 are unique relative to data segments already stored by the inline deduplication pipeline. The processor logs the metadata for the segment references of the data segments identified as unique, and the unanchored tail data, into a low-latency software-defined persistent memory. A low-latency hardware compressor accelerator compresses the data segments numbered 2-7, 11-13, and 17-19 and stores the compressed data segments numbered 2-7, 11-13, and 17-19 into the low-latency software-defined persistent memory. By acknowledging that the unique data segments numbered 2-7, 11-13, and 17-19, which were part of the data file received from the client, are stable in the low-latency software-defined persistent memory, the processor enables the client to send the next part of any data file to be copied.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "embodiment" in various places in the specification do not necessarily all refer to the same embodiment.

A client device can take the form of software, physical machines, or virtual machines, or any combination thereof, though no particular device implementation or configuration is required for any embodiment. Similarly, data protection platform components such as databases, storage servers, storage volumes, storage disks, backup servers, restore servers, backup clients, and restore clients can likewise take the form of software, physical machines, or virtual machines, or combinations thereof, although no particular component implementation is required for any embodiment. Where virtual machines are employed, a hypervisor or other virtual machine monitor may be employed to create and control the virtual machines.

As used herein, the term "data" is intended to be broad in scope. Accordingly, data may include data objects (or objects), data file segments (or segments), such as may be produced by data stream segmentation processes, data chunks, data blocks, atomic data, emails, data files, contacts, directories, sub-directories, volumes, etc. In some embodiments, the terms "file," "data file," "object," and "data object" may be used interchangeably.

In addition, the term "backup" (or "data backups," "backed-up data," etc.) is intended to be construed broadly and includes, but is not limited to, partial backups, incremental backups, differential backups, full backups, clones, snapshots, any other type of copies of data, and any combination of the foregoing. Any of the foregoing may, or may not, be deduplicated. In addition, the storage of data can employ any suitable storage technique, infrastructure, hardware such as a solid-state drive, and/or a hard disk drive, or virtual storage systems provided by a cloud service provider.

As described above in reference to FIG. 1, the system 100 uses a portion of dynamic random-access memory as a persistent store 102 that is automatically backed up to non-volatile memory express device 106 on a power loss 104 and restored on boot up. On the next generation of PowerProtect Data Domain platforms, this functionality is provided by Dell's software-defined persistent memory 102, which obviates the need to copy data out to any external non-volatile memory device. The system 100 specifically uses the persistent memory 102 (software-defined persistent memory) to log the post-deduplication, compressed data as well as any trailing unanchored data that needs to be persisted, to reply to the client that data is committed persistently.

The system 100 uses an on-chip CPU integrated compression hardware accelerator that not only avoids extra copies in intermediate buffers but also reduces the latency to copy data from memory to an external device as is the case with the external peripheral component interconnect express and the QAT card on some of the older data protection platforms. Specifically, the system 100 uses the Intel on-chip Integrated Generation 4 QAT available inside Intel Sapphire Rapids CPUs to compress the data before it is logged in the software-defined persistent memory 102. The use of the low latency QAT and the software-defined persistent memory 102 to log post-deduplication data, thereby avoiding memory-to-memory copies and memory-to-device copies, enables the inline deduplication pipeline to reply back to a client much faster, which in turn enables the client to pump data faster to the inline deduplication pipeline. While storing relatively small amounts of metadata, the persistent memory 102 stores only post-deduplication and compressed data (plus unanchored tail data), thereby greatly reducing the capacity requirement, thereby keeping the cost of the system 100 low.

Exemplary Environments

A client may execute, or otherwise be associated with, one or more instances of each of one or more applications, and may be associated with a customer of a data backup and protection service. For example, a client may provide computing resources (such as databases) for users (such as website visitors) of a data protection service provider's customer, and data which may be protected by and restored by executing the data protection service provider's backup application, and may include a primary storage system to store client data, as well as an interface for communicating with other systems and devices. While example applications may include database applications such as a SQL Server, data file systems, as well as other types of data stores, the applications executed by any client are not limited to any particular functionality or type of functionality. As further described herein, components of a client (such as client applications and data storage) may be a data source, or be associated with one or more data sources such as a database, a virtual machine, and a storage device.

Figure 2:
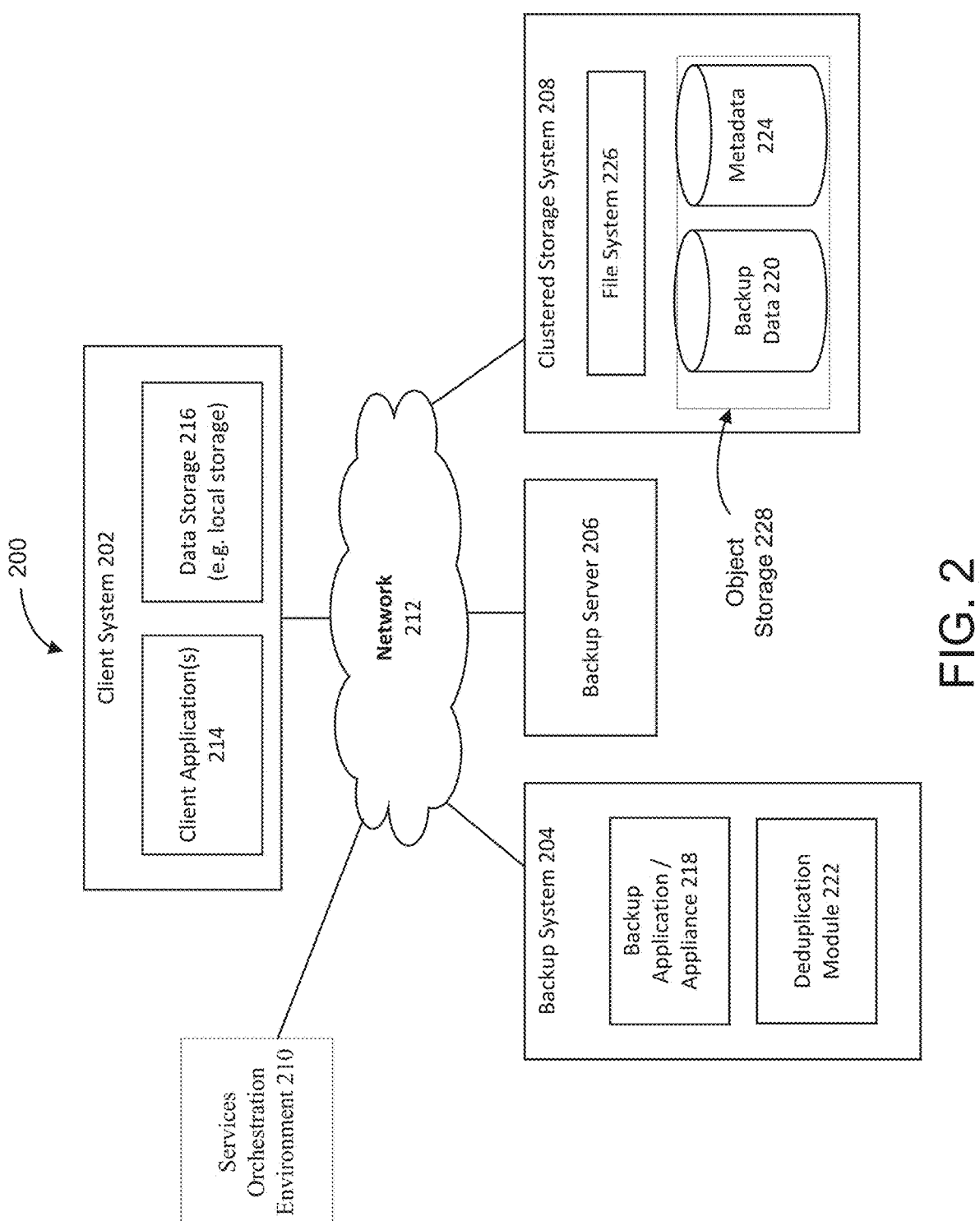
FIG. 2 is a block diagram illustrating an example operating environment for a low-latency hardware accelerator and persistent memory for inline deduplication systems, according to one or more embodiments of the disclosure.

More specifically, and with reference to FIG. 2, shown is a block diagram illustrating an example of an operating environment 200 for a low-latency hardware accelerator and persistent memory for inline deduplication systems, according to one or more embodiments of the disclosure. As shown, the operating environment 200 may include a client system 202, which may be associated with a client or customer of a data backup and protection service, a backup system 204, which may be associated with a data backup and protection service provider a backup server 206, a clustered storage system 208, and a services orchestration environment 210, which may interact via a network 212, which may be any type of wired or wireless network including a local area network (LAN), a wide area network (WAN), or a direct communication link, or other suitable connection. Accordingly, the client system 202 may function as a client from which backups are performed, and may comprise a virtual machine.

In addition, the client system 202 may host one or more client applications 214, and may include data storage 216, as well as an interface for communicating with other systems and devices, such as the backup system 204. Since the client applications 214 may create new and/or modified data that is desired to be protected, the client system 202 is an example of a host device. The data storage 216 may be used to store client data, which may, along with the client system 202 (such as the client applications 214), be backed up using the backup system 204. As further described herein, components of the client system 202 (such as the client applications 214 and the data storage 216) may be a data source, or be associated with one or more data sources such as a database, a virtual machine, and a storage device. In addition, components of the client system 202 may be data sources that are associated with the client system 202, but these components may reside on separate servers, such as a data server, or a cloud-computing infrastructure. The client system 202 may include a backup client application, or plug-in application, or Application Programming Interface (API) that cooperates with the backup system 204 to create backups of client data, which can be restored to the client system 202.

In at least one embodiment, the backup system 204 may represent one or more components of a Data Domain Restorer-based deduplication storage system, and a backup server 206 may be implemented in conjunction with a Data Domain deduplication storage server provided by Dell EMC for use with Data Domain Restorer storage devices. For example, the backup server 206 may be a stand-alone entity, or may be an element of the clustered storage system 208. In some embodiments, the backup server 206 may be a Dell EMC Avamar server or a Dell EMC Networker server, although no particular server is required, and other backup and storage system configurations are contemplated. The backup system 204 may include a backup application/appliance 218, which may be a PowerProtect Data Domain appliance 218, which performs, manages, or coordinates the creation and restoration of data that may be backed-up. For example, data to be backed-up from the client system 202 may be communicated from the client system 202 to the backup appliance 218 for initial processing, after which the processed data, such as backup data 220, is uploaded from the backup appliance 218 for storage at the clustered storage system 208. In some embodiments, the backup appliance 218 may cooperate with a backup client application of the client system 202 to back up client data to the clustered storage system 208, and to restore backup data from the clustered storage system 208 to the client system 202.

In some embodiments, the backup appliance 218 may be a part of, or work in conjunction with, a storage appliance. For example, the storage appliance may include a Dell EMC Cloud Boost appliance, although any suitable appliance is contemplated. In addition, the backup appliance 218 may provide a variety of useful functionalities such as source-side data deduplication, data compression, and WAN optimization boost performance and throughput, while also possibly reducing the consumption and cost of network bandwidth and cloud storage capacity, but one, some, or all, of these functions of the backup appliance 218 may be performed using deduplication logic via a deduplication module 222. For example, the deduplication module 222 can provide data segmentation, as well as in-flight encryption as the data is sent by the backup appliance 218 to the clustered storage system 208. However, as further described herein, in some embodiments, data deduplication may be performed entirely within the clustered storage environment 208. It should be noted that the backup appliance (or storage appliance) 218 may be implemented in various forms, such as a virtual, physical, or native public cloud appliance to fit the requirements of a particular configuration, and the backup appliance 218 may be used with various types of data protection environments, including public and private object storage clouds.

Figure 3:
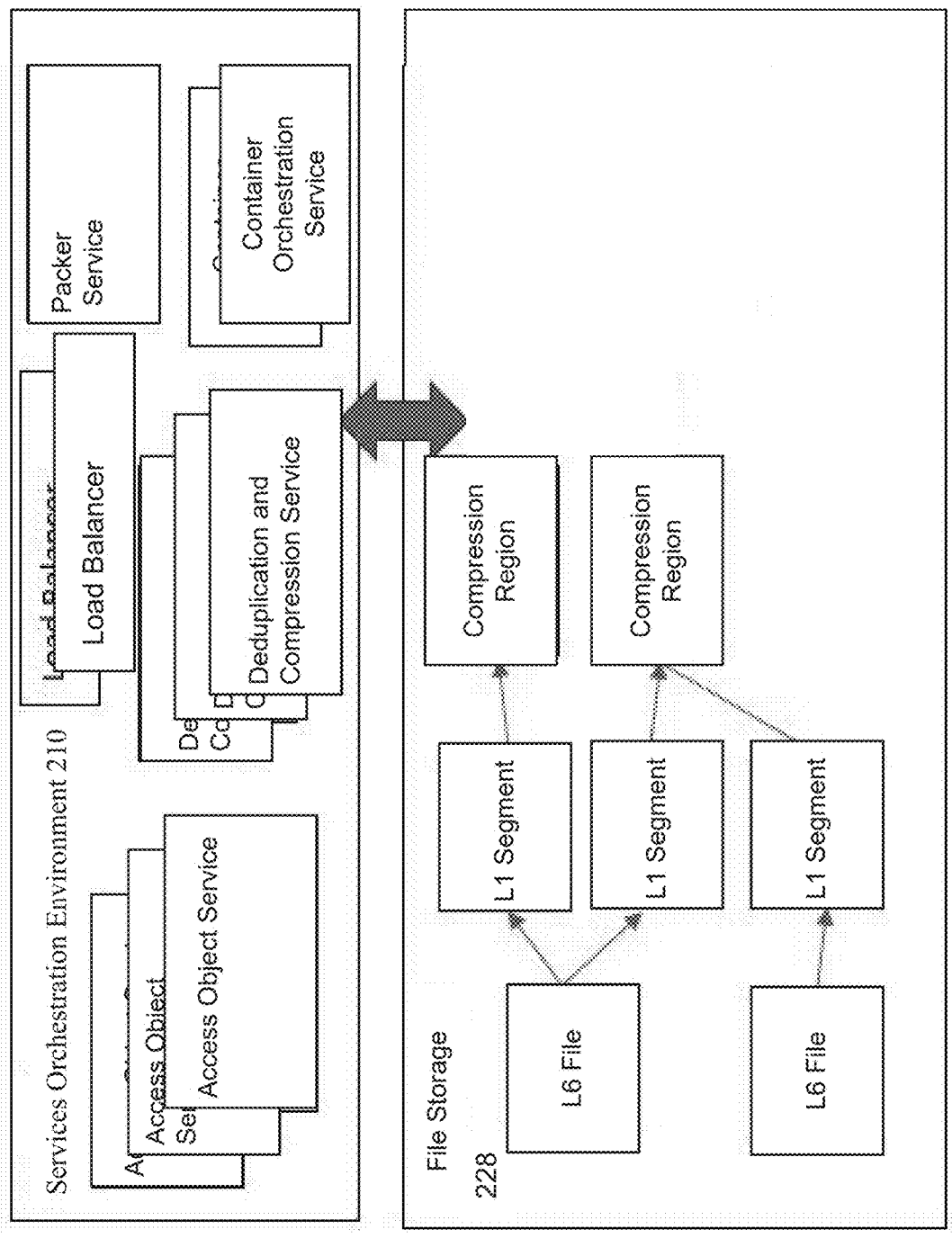
FIG. 3 is a block diagram illustrating parts of an example operating environment for a low-latency hardware accelerator and persistent memory for inline deduplication systems, according to one or more embodiments of the disclosure.

The clustered storage system 208, as further described herein, may store backup data 220 (backup files or backup objects) within a one or more nodes, as further described herein. As shown, the clustered storage system 208 may also store metadata 224 for (or associated with) the backup data 220, and one or more instances of a filesystem 226 that catalogs backup files and other data residing in the clustered environment. In general, the storage of the backup data 220 may be configured to store data backups for the client system 202, which may be restored in the event of a loss of data. The clustered storage system 208 may be a file storage system or an object storage system that includes file storage 228 or object storage 228, as further described herein. As shown in FIG. 3, the services orchestration environment 210 (such as a Kubernetes cloud computing environment) may provide for the deployment of various types of services. The services orchestration environment 210 may enable the deployment of services for file copying and for conditional storage in the file storage 228 or the object storage 228.

After generating fingerprints for data file segments, the backup appliance 218 compares these new fingerprints against previously generated fingerprints for previously stored data file segments that were previously identified as being unique. These comparisons determine which of the new fingerprints are unique, and therefore were generated for data file segments which are unique, and which of the new fingerprints are duplicates, and therefore were generated for data file segments which are duplicates. Upon the identification of any unique fingerprints generated for the data file segments that are unique, the backup appliance 218 can store the unique data file segments in a compressed format in a compression region.

L6 Files or Objects, L1 Segments, & L0 Compression Regions

Figure 4:
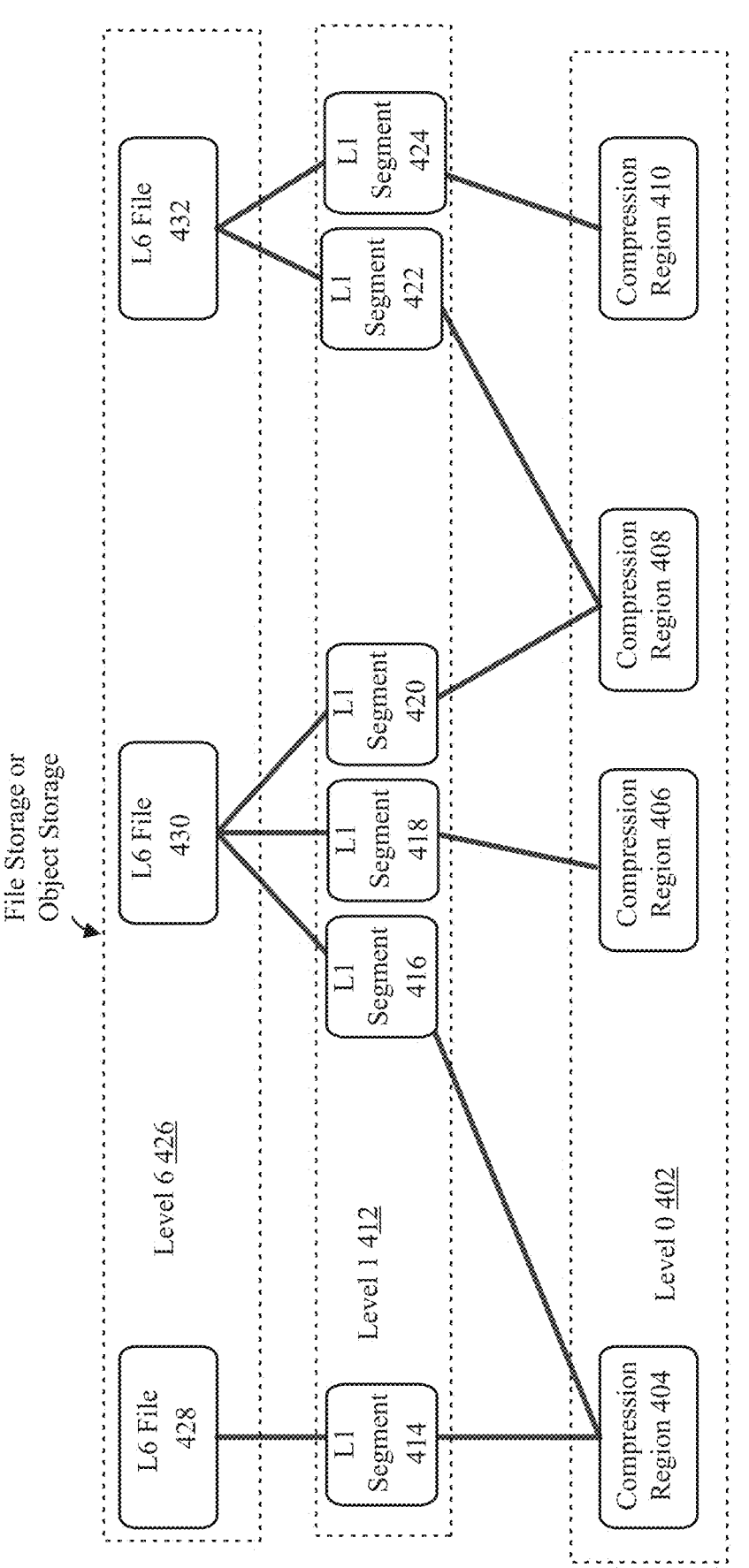
FIG. 4 is a block diagram illustrating relationships between L6 files or objects, L1 segments, and L0 compression regions for a low-latency hardware accelerator and persistent memory for inline deduplication systems, according to one or more embodiments of the disclosure.

FIG. 4 depicts that a portion or all of a data file or data object may be represented by a Merkle tree 400 with the bottom level of the Merkle tree 400 representing the data file segments, which may be referred to as level 0 data file segments or Level 0 402 data file segments, which may include compression regions 404-410. Each compression region may store unique data file segments that have been compressed and each compressed data file segment's corresponding unique fingerprint and data file segment size. Large numbers of sequential fingerprints, such as 20-byte SHA-1 fingerprints, generated for sequential data file segments, may be grouped together at the next higher level of the Merkle tree 400 to form groups of fingerprints for data file segments, which may be referred to as a level 1 segment or a L1 segment. Hundreds of the fingerprints, of the groups of data file segments, that form L1 segments, may be grouped together and hashed as level 2 fingerprints or a L2 segment, and this process of grouping and hashing fingerprints for increasingly larger groups of fingerprints may continue up to level 6 or L6, which represents the entire data file or data object.

The top of a Merkle tree 400 is referred to as an L6 file or object, even though it may actually refer to fingerprints for groups of data file segments in a lower numbered level. Fingerprints for segments which are above L0 may be referred to as LP segments, such that the Merkle tree 400 may be referred to as an LP tree. While multiple L0 data file segments may be compressed into 64-kilobyte (KB) to 128 KB sized compression regions, LP segments are not compressed because fingerprints, such as 20-byte SHA-1 finger-prints, are quite random and do not compress well.

FIG. 4 depicts a portion of data file storage or the object storage that may be represented by Level 1 412, which may include L1 segments 414-424. Each L1 segment may store metadata that identifies the data object or data file to which a particular L1 segment belongs, a reference to a similarity group identifier, a fingerprint array that stores those finger-prints included in a L1 segment, and the sizes of each data file segment represented by each fingerprint. FIG. 4 also depicts a portion of data file storage or object storage that may be represented by Level 6 426, which may include L6 files 428-432.

Each data file or data object has a corresponding L6 file or object, which may reference the one or more L1 segments associated with the data object or data file, since the asso-ciated L1 segments are based on an array of fingerprints of the data file segments which comprise the data object or data file. Deduplication happens when different data files or data objects refer to the same L0 data file segments and LP segments. For example, if two data files are exactly the same, they would have the same L6 fingerprints. However, if two data files only partially overlap in their data, then some branches of the Merkle tree will be identical, with the same LP fingerprints and the same L0 data file segments, while other branches of the Merkle tree will be different, with different LP fingerprints and different L0 data file segments.

Figure 5:
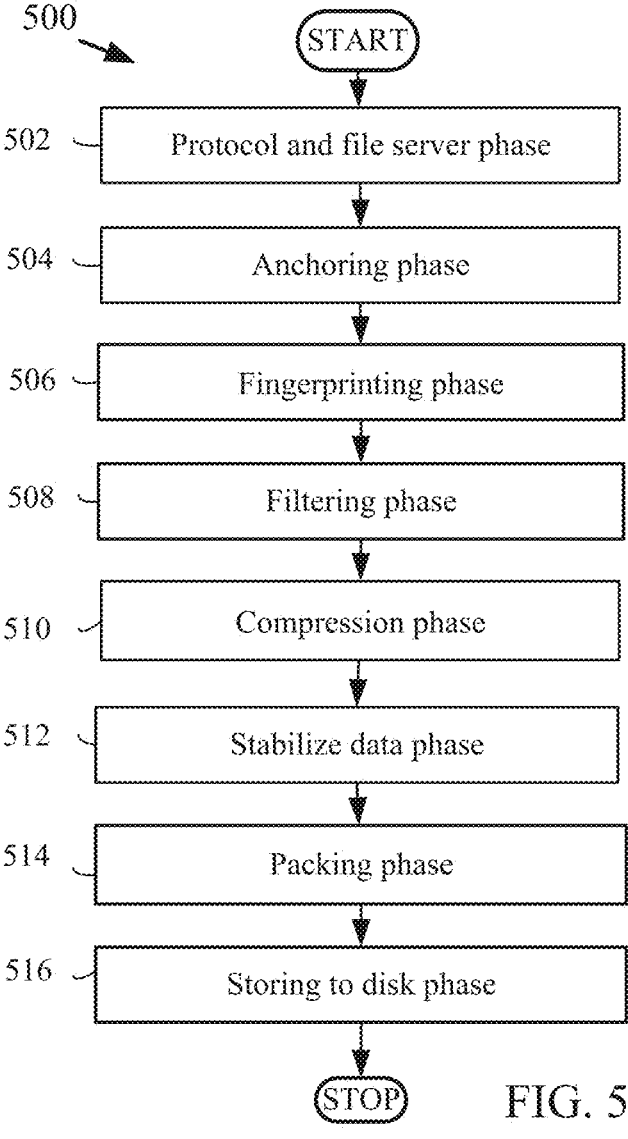
FIG. 5 is a block diagram illustrating an example method for an inline deduplication pipeline, which may be revised and then used by a low-latency hardware accelerator and persistent memory for inline deduplication systems, according to one or more embodiments of the disclosure.

FIG. 5 depicts an example block-level description of the inline deduplication pipeline 500 that exists in the current generation of PowerProtect Data Domain appliances, for certain phases involving the persistent memory 102 and the processor 108 of FIG. 1, and the client (system) 202 and the backup appliance 218 of FIG. 2. In the inline deduplication pipeline 500, the data is deduplicated as it is ingested, as opposed to a post-deduplication system where data is landed to some form of stable storage first and later deduplicated. For an example using the network file system protocol, in the protocol and file server phase 502, the PowerProtect Data Domain appliance provides a network file system server to which the network file system clients can write data.

In the anchoring phase 504, data is anchored to created segments, and any segment references of anchored data and any remaining small amount of unanchored tail data are identified for logging. In the fingerprinting phase 506, a fast in-memory operation is used to create a SHA-XOR based fingerprint for each anchored data segment. In the filtering phase 508, an in-memory fingerprint cache is used to lookup fingerprints to deduplicate the anchored data segments and identify the unique data segments. The small computer system interface interrupt steering logic (SISL) enables the use of intermittent lookups to load fingerprints, as needed, from a flash drive to main memory.

In the compression phase 510, the processor 108 com-presses the unique data segments in each compression region. In the stabilizing phase 512, the post-deduplication compressed data is logged to a high latency hard disk drive. In the packing phase 514, compressed data and metadata are packed into large containers to maximize throughput. In the storing to disk phase 516, a solid-state cache is updated with new metadata, while deduplicated data is written in large containers to disks, The backup appliance 218 modifies this inline dedupli-cation pipeline 500 in PowerProtect Data Domain to take advantage of a combination of memory latencies of soft-ware-defined persistent memory 102 and low latency QAT compression. The backup appliance 218 identifies the stages or phases of the inline deduplication pipeline 500 that are not just throughput optimized but also very sensitive to latency. In the inline deduplication pipeline 500, the phases that are sensitive to latency are the phases which occur just after the reply is sent back to the client 202 acknowledging receipt of the write request.

To acknowledge the data as stable, the inline deduplica-tion pipeline 500 needs to stabilize the data from the client 202 in some persistent media before replying about stability to the client 202. The phases that are sensitive to latency are from the protocol and file system semantics handling phase to the phase where the processor 108 stabilizes data. Opti-mizing these phases can reduce the latency and thereby enable a faster reply about stability to the client 202, which enables the client 202 to pump data faster to the backup appliance 218.

The backup appliance 218 makes use of the software-defined persistent memory 102 to log data from various stages of the deduplication pipeline 500 that are latency sensitive, such as the components of the revised protocol and file system phase 502 logging the file system namespace metadata as transaction logs. Ensuring deduplication effi-ciency requires reducing the number of forced commits on the file system server that would force the processor 108 to anchor the segments without reaching a naturally found anchor boundary. To reduce the commits, PowerProtect Data Domain always replies to the client 202 that the data is stable as long as the client 202 is writing sufficiently large chunks (such as chunks that are greater than 513 KB) to take advantage of the anchoring algorithm that efficiently divides the data into segments. Therefore, the backup appliance 218 also makes use of software-defined persistent memory 102 during the revised anchoring phase 504 by identifying any segment reference of the data that is anchored inline into segments for subsequent logging to the persistent memory and identifying any remaining small amount of tail data that is left unanchored for subsequent logging to the persistent memory 102. This tail data is less than the segment size in the backup appliance 218 and is left unanchored so that the processor 108 does not force an un-natural anchor.

Metadata for a data segment may referred to as a segment reference and may include the data segment's 20-byte SHA-1 hash fingerprint, the data segment's 4-byte XOR (exclusive or) value, the data segment's size, and a few other bytes. Each data segment is created in a content-defined manner with a data segment size that varies in a range, such as the range from 4 KB to 12 KB in Data Domain. The location of the first data segment combined with the size of each data segment enables the segment references to identify each anchor boundary, where one data segment ends and the next data segment begins.

In the unrevised fingerprinting phase 506, fast in-memory operations are used to create a SHA-XOR based fingerprint for each anchored data segment. In the unrevised filtering phase 508, an in-memory fingerprint cache is used to lookup fingerprints which are used to deduplicate data segments and thereby identify any unique data segments. After generating fingerprints, the processor 108 checks each newly generated fingerprint against an in-memory fingerprint cache, which currently stores the most recently used fingerprints. If one of the newly generated fingerprints matches any fingerprint in the fingerprint cache, the processor 108 determines that this newly generated fingerprint is a duplicate, and therefore the data file segment represented by this newly generated fin-gerprint is also a duplicate, so this newly generated finger-print does not need to be stored again in any fingerprint index and the data file segment does not need to be stored again in the object storage 332.

If one of the newly generated fingerprints is not a match for any fingerprint in the fingerprint cache, the processor 108 can use the small computer system interface interrupt steering logic to enable the use of intermittent lookups to load additional fingerprints from flash to memory. If one of the newly generated fingerprints matches any of the additional fingerprints loaded to memory from flash, the processor 108 determines that this newly generated fingerprint is a duplicate, and therefore the data file segment represented by this newly generated fingerprint is also a duplicate, so this newly generated fingerprint does not need to be stored again in any fingerprint index and the data file segment does not need to be stored again in the object storage 332. However, if one of the newly generated fingerprints is not a match for any fingerprint in the fingerprint cache nor any of the additional fingerprints loaded from flash into memory, then the processor 108 determines that this newly generated fingerprint is not a duplicate, and therefore the data file segment represented by this newly generated fingerprint is also not a duplicate, so this newly generated fingerprint needs to be stored in a fingerprint index and the corresponding data file segment needs to be stored in the object storage 332.

Instead of storing the full fingerprints, such as the 20-byte SHA-1 fingerprints, in the fingerprint cache which is queried to determine whether any newly generated fingerprint is a duplicate, the backup appliance 218 may use short versions of the fingerprints involved in the deduplication process. For example, the processor 108 can compare the first 8 bytes of a fingerprint from the group of newly generated fingerprints against the first 8 bytes stored in the fingerprint cache for each of the 20-byte SHA-1 fingerprints which were previously determined to be unique fingerprints and which may also be stored in object storage 332 or in non-volatile flash memory. By storing only the first 8 bytes of a previously existing fingerprint instead of the full 20 bytes of the previously existing fingerprint into the fingerprint cache, the backup appliance 218 can represent 150% more fingerprints because 5 partial fingerprints at 8 bytes each equals 40 bytes which is equivalent to 2 full fingerprints at 20 bytes each, such that the fingerprint cache can now represent 5 partial fingerprints for every 2 fingerprints that the fingerprint cache used to represent. 5 fingerprints is 250% relative to 2 fingerprints (5 divided by 2 equals 2.5, or 250%), which is a 150% increase in represented fingerprints. Since the fingerprint index that is cached is limited by the storage capacity of the relatively small available cache, representing an additional 150% of the fingerprints previously represented can significantly reduce the number of fingerprints which require the high latency retrieval of large numbers of fingerprints from flash to memory.

Post-deduplication non-duplicate or unique data must be subsequently written into long-term storage. This data is written compressed to reduce the footprint of persistent memory 102 needed. To further reduce the latency of replying back to the client 202, the backup appliance 218 uses an on-chip low-latency hardware accelerator to compress the data that is determined to be unique. The backup appliance 218 uses the Intel Generation 4 integrated QAT that is available with Sapphire Rapids CPUs. This gives the backup appliance 218 the triple benefit of being able to write post-deduplication data to the software-defined persistent memory 102, and reduce the persistent memory 102 footprint, being able to reply back to the client 202 with low latency by reducing latencies coming from memory to device copies so that the client 202 can pump data faster, and freeing up the CPUs to process the other stages of the inline deduplication pipeline 500 faster.

Therefore, in the revised compression phase 510, a low-latency gzip compression using on-chip Intel generation 4 QAT takes few tens of microseconds to compress each compression region. In the revised stabilizing phase 512, the hardware compression accelerator logs the compressed post-deduplication data in the low-write latency software-defined persistent memory 102.

The hardware accelerator compresses data file segments into compression regions, containers, and blobs that will be packed into an object that will be written to an underlying storage, such as object scale or an object store. Then the processor 108 can review the post-deduplication log for recently received compression regions, pack any recently received compression regions that are collectively sufficient to meet the capacity requirements of efficiently used containers, large objects, or blobs. In the unrevised packing phase 514, compressed data and metadata are packed into large containers to maximize throughput.

Then the processor 108 stores the containers, the large objects, or blobs to long-term storage, such as the underlying object storage 332, Object Scale, or an object store provided by the public cloud, which may be a private or public object storage system or other highly-available shared storage system that can scale to the needed size and provide data access even if there are underlying hardware failures. In the unrevised storing to disk phase 516, solid-state drive cache is updated with new metadata, and deduplicated data is written in large containers to disks. Reduced latency in inline deduplication pipeline 500, particularly in the post deduplication logging, enables the client 202 to push data faster, thereby giving higher performance with less cost.

The backup appliance 218 can support multiple storage tiers, both internal to a cluster of nodes as well as external to the cluster of nodes, such as a cloud tier. Storage tiers may be configured to use faster and more expensive media or slower and less expensive media. A customer's data protection platform administrator can select configurations to create multiple storage tiers for a given media, such as creating storage tiers for different Merkel trees.

The combination of using a lower latency hardware accelerator and low latency persistent memory 102 allows the backup appliance 218 to achieve higher performance with a fixed number of clients. Additionally, offloading compression continues to give the extra CPU cycles back to the processor 108, which in turn help to improve the performance on the file system server side.

The backup appliance 218 applies the combination of low latency on-chip hardware accelerators (for compression) and persistent memory 102 technology (for stable callback) to a large-scale inline deduplication appliance in a unique way that boosts the performance of the inline deduplication pipeline. Specifically, the backup appliance 218 dramatically reduces the latencies in the inline deduplication pipeline that can add up due to the need to stabilize data, by reducing or eliminating memory-to-memory copies and memory-to-device copies. The backup appliance 218 carves out a piece of memory that will be persisted on failures to non-volatile memory express, and uses this memory as the logging space for a post-deduplication log, unanchored tail data, and file system metadata log, while using on-chip QAT that avoids latencies coming from memory-to-device copy for compression. Logging different pieces of metadata, and in particular the post-deduplication and compressed data along with trailing unanchored data for persistence in the inline deduplication pipeline, while avoiding latencies to stabilize data and metadata from memory-to-memory copies, and memory-to-device copies is unique and allows the backup appliance 218 to get the best performance with cost efficiency.

FIG. 6 is a flowchart that illustrates a method for a low-latency hardware accelerator and persistent memory for inline deduplication systems, under an embodiment. Flowchart 600 illustrates method acts illustrated as flowchart blocks 602-620 for certain steps involving the persistent memory 102 and the processor 108 of FIG. 1, and the client 202 and the backup appliance 218 of FIG. 3.

Data and a write request are received from a client, block 602. The system receives data for deduplication. For example, this can include the processor 108 receiving a part of a database file being currently copied from the client 202.

Data can be the quantities, characters, or symbols on which operations are performed by a computer. A write request can be an instruction to a computer to store information. A client can be a desktop computer or workstation that is capable of obtaining information and/or an application from a server.

After receiving data with a write request from a client, the write request is optionally acknowledged, block 604. The system can acknowledge the client's request to write the data. By way of example and without limitation, this can include the processor 108 acknowledging the request by the client 202 to write the received part of the database file.

Following receipt of data from a client, multiple anchor boundaries are optionally identified within the data, and the data is anchored at the multiple anchor boundaries, thereby creating multiple data segments, block 606. The system can segment data for deduplication. In embodiments, this can include the processor 108 identifying anchor boundaries for creating data segments numbered 1 to 95. An anchor boundary can be a location identified for the beginning or the end of a data segment. A data segment can be a part into which an information file is divided.

Having received data from a client, metadata for the file system namespace for the data received from the client is optionally logged to the persistent memory, block 608. The system can persist namespace metadata. For example, and without limitation, this can include the processor 108 logging the file system namespace metadata for the database file in transaction logs in the persistent memory 102.

Metadata can be a set of information that describes and gives information about other information. A file system namespace can be a set of identifiers used to reference an organization of data objects. Persistent memory can be a type of computer storage that retains data even when the power is off.

A copy of any data that is stored by the persistent memory may be automatically backed up to a nonvolatile memory device which is integrated with the persistent memory, in response to detecting a power loss by the persistent memory, and the copy of the data may be copied back from the nonvolatile memory device to the persistent memory, in response to detecting a power restoration by the persistent memory. For example, on power loss 104, data is copied by a basic input/output system (BIOS) from the dedicated persistent memory 102 to non-volatile random-access memory, such as M.2 Non-Volatile Memory Express (NVMe) drives 106, and on reset, a power supply unit provides the power to copy the data back from the non-volatile random-access memory 106 to the persistent memory 102. A copy can be a thing made to be similar or identical to another thing. A nonvolatile memory device can be a type of computer storage that retains data even when the power is off. A power loss can be a reduction of a required level of electrical energy. A power restoration can be a reinstatement of a required level of electrical energy.

Following the segmenting of data, a processor, which is executing an inline deduplication pipeline, identifies any data segment which is created from data received with write request from client, and which is unique relative to data segments already stored by inline deduplication pipeline, block 610. The system identifies unique data segments. By way of example and without limitation, this can include the processor 108 executing phases of an inline deduplication pipeline, which determines that the data segments numbered 2-7, 11-13, and 17-19 are unique relative to data segments already stored by the inline deduplication pipeline.

A processor can be another term for central processing unit or CPU. An inline deduplication pipeline can be a series of operations that removes superfluous copies of data while the data is being prepared to be written to long-term storage. Unique can be the only one of its kind, and/or unlike anything else.

Identifying any data segment as unique relative to data segments already stored by the inline deduplication pipeline may include the inline deduplication pipeline generating a fingerprint that corresponds to each data segment, and determining that any of the corresponding fingerprints lack matches to each fingerprint that was previously created for previously received data segments. For example, the processor 108 uses a fast in-memory operation to create a SHA-XOR based fingerprint for each data segment, uses an in-memory fingerprint cache to lookup fingerprints to deduplicate data segments, and, if needed, execute intermittent lookups to load fingerprints from flash drive to the main memory. A fingerprint can be a bit string which was mapped from a larger data object or data file, and which is generated to uniquely identify the larger data object or data file. A match can be an object that fulfills the specified conditions of a computer search.

Having identified any unique data segments, a processor logs any segment reference of any data segment which is identified as unique into persistent memory, which has a lower write latency than any non-volatile random-access memory device that is external to the persistent memory, block 612. The system persists metadata for the unique data segments. In embodiments, this can include the processor 108 logging the segment references of the data segments numbered 2-7, 11-13, and 17-19.

A segment reference can be metadata for a data object. Write latency can be a time delay between the cause and the effect of a command to store data and the physical change in the system being observed. A non-volatile random-access memory device can be a type of computer storage that retains data even when the power is off.

In addition to persisting metadata for the unique data segments, a processor logs any of the data which is received from the client, and which is yet to be anchored into any data segment, into persistent memory, block 614. The system persists any unanchored tail data. For example, and without limitation, this can include the processor 108 logging the unanchored tail data for the database file, into the low-latency software-defined persistent memory 102.

After unique data segments are identified, a hardware accelerator, which has a lower compression latency than the processor executing the inline deduplication pipeline, compresses any data segment which is identified as unique, block 616. The system uses a hardware accelerator to quickly compress unique data segments. By example and without limitation, this can include a low-latency hardware compressor accelerator compressing the data segments numbered 2-7, 11-13, and 17-19, after the processor 108 executed phases of an inline deduplication pipeline which determines that the data segments numbered 2-7, 11-13, and 17-19 are unique relative to data segments already stored by the inline deduplication pipeline.

A hardware accelerator can be a specialized circuit or device that is designed to perform a specific computational task more efficiently than a general-purpose processor. A compression latency can be a time delay between the cause and the effect of a command to reduce the amount of storage necessary for data and the physical change in the system being observed.

Following the compression of any unique data segments, a hardware accelerator stores any compressed data segments into persistent memory, block 618. The system persists compressed unique data segments. In embodiments, this can include a low-latency hardware compressor accelerator storing the compressed data segments numbered 2-7, 11-13, and 17-19 into compression regions in a post-deduplication log within the low-latency software-defined persistent memory 102. A compressed data segment can be a part into which an information file is divided, and which has been altered in form to reduce the amount of storage necessary.

Having stored the compressed data in stable memory, a client is enabled to provide additional data by a processor acknowledging to the client that the data received from the client is stable in the persistent memory, block 620. The system acknowledges the data from the client is stable, i.e., it can be firmly established and not likely to change of fail. For example and without limitation, this can include the processor 108 enabling the client 202 to send the next part of the data file to be copied, by the processor 108 acknowledging to the client 202 that the unique data segments numbered 2-7, 11-13, and 17-19, which were part of the data file received from the client 202, are stable in the low-latency software-defined persistent memory 102.

After storing compressed data segments in persistent memory, the compressed data segments and metadata in corresponding segment references in the persistent memory are optionally packed with other compressed data segments and metadata in corresponding other segment references in the persistent memory into a container which is optionally stored to a storage device that is external to the persistent memory, block 622. The system can clear the filled persistent memory 102 for subsequent use by storing its content in a container in external storage. By way of example and without limitation, this can include the processor 108 reviewing the post-deduplication log in the persistent storage for recently received compression regions, packing recently received compression regions which include the data file segments numbered 2-7, 11-13, and 17-19 into a container, such as a large object, and then storing the large object to a destination storage, such as the underlying object storage 332.

A container can be a data structure that is a collection of objects. A storage device can be a piece of computer equipment on which information can be retained. External can be using a disk or tape drive rather than the main memory.

Although FIG. 6 depicts the blocks 602-622 occurring in a specific order, the blocks 602-622 may occur in other orders. In other implementations, each of the blocks 602-622 may also be executed concurrently and/or in combination with other blocks and/or some blocks may be divided into a different set of blocks.

Exemplary Computing System

Figure 7:
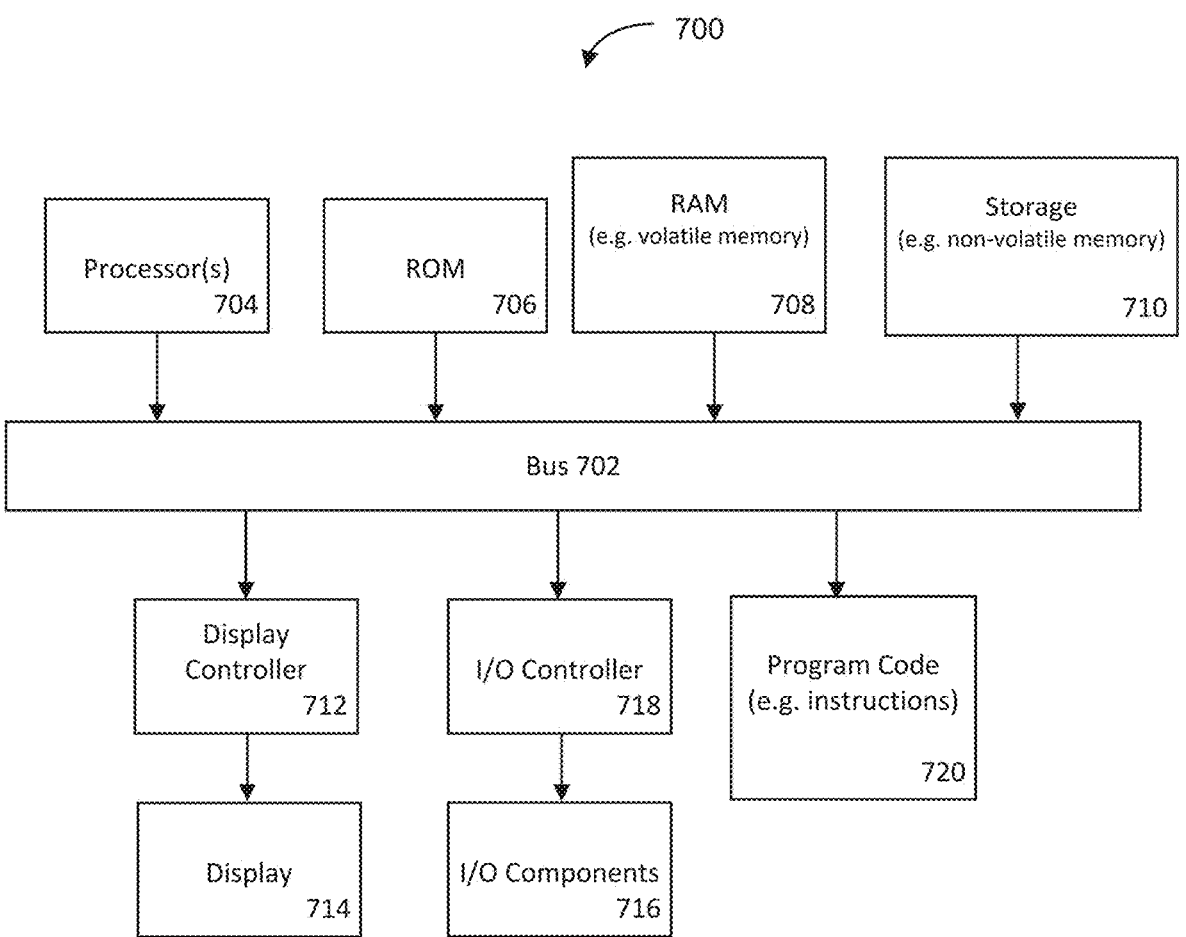
FIG. 7 is a block diagram illustrating a computing system for a low-latency hardware accelerator and persistent memory for inline deduplication systems, according to one or more embodiments of the disclosure.

FIG. 7 shows a block diagram of an example of a computing system that may be used in conjunction with one or more embodiments of the disclosure. For example, computing system 700 (or system, or server, or computing device, or device) may represent any of the devices or systems described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 702 which may be coupled to a processor 704, ROM (Read Only Memory) 706, RAM (or volatile memory) 708, and storage (or non-volatile memory) 710. The processor(s) 704 may retrieve stored instructions from one or more of the memories 706, 708, and 710 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 704 may perform operations in an on-demand or "cloud computing" environment or as a service, such as within a "software as a service" (SaaS) implementation. Accordingly, the performance of operations may be distributed among the one or more processors 704, whether residing only within a single machine or deployed across a number of machines. For example, the one or more processors 704 may be located in a single geographic location (such as within a home environment, an office environment, or a server farm), or may be distributed across a number of geographic locations.

The RAM 708 may be implemented as, for example, dynamic RAM (DRAM), or other types of memory that require power continually in order to refresh or maintain the data in the memory. Storage 710 may include, for example, magnetic, semiconductor, tape, optical, removable, non-removable, and other types of storage that maintain data even after power is removed from the system. It should be appreciated that storage 710 may be remote from the system, such as accessible via a network.

A display controller 712 may be coupled to the bus 702 in order to receive display data to be displayed on a display device 714, which can display any one of the user interface features or embodiments described herein and may be a local or a remote display device. The computing system 700 may also include one or more input/output (I/O) components 716 including mice, keyboards, touch screen, network interfaces, printers, speakers, and other devices. Typically, the input/output components 716 are coupled to the system through an input/output controller 718.

Program code 720 may represent any of the instructions, applications, software, libraries, toolkits, modules, components, engines, units, functions, logic, etc. as described herein. Program code 720 may reside, completely or at least partially, within the memories described herein (such as non-transitory computer-readable media), or within a processor during execution thereof by the computing system.

Program code 720 may include both machine code, such as produced by a compiler, and files containing higher-level or intermediate code that may be executed by a computing system or other data processing apparatus (or machine) using an interpreter. In addition, program code 720 may be implemented as software, firmware, or functional circuitry within the computing system, or as combinations thereof. Program code 720 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (such as any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In addition, the use of the term "or" indicates an inclusive or (such as "and/or") unless otherwise specified. For example, the phrase "at least one of x, y, or z" means any one of x, y, and z, as well as any combination thereof. In addition, the term "based on" is used to describe one or more factors that affect a determination.

These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system for a low-latency hardware accelerator and persistent memory for inline deduplication systems, comprising:

one or more processors; and a non-transitory computer readable medium storing a plurality of instructions, which when executed, cause the one or more processors to:

identify, by a processor that executes an inline deduplication pipeline, any data segment which is created from data received with a write request from a client, and which is unique relative to data segments already stored by the inline deduplication pipeline;

log, by the processor, any segment reference of any data segment which is identified as unique into persistent memory, which has a lower write latency than any non-volatile random-access memory device that is external to the persistent memory;

log, by the processor, any of the data which is received from the client and which is yet to be anchored into any data segment, into the persistent memory;

compress, by a hardware accelerator that has a lower compression latency than the processor, any data segment which is identified as unique;

store, by the hardware accelerator, any compressed data segments into the persistent memory; and enable the client to provide additional data by the processor acknowledging to the client that the data received from the client is stable in the persistent memory.

2. The system of claim 1, wherein the plurality of instructions further causes the processor to acknowledge that the write request has been received with the data, in response to receiving the write request with the data from the client.

3. The system of claim 1, wherein the plurality of instructions further causes the processor to identify multiple anchor boundaries within the data, and anchor the data at the multiple anchor boundaries, thereby creating multiple data segments, in response to receiving the data from the client.

4. The system of claim 1, wherein the plurality of instructions further causes the processor to log metadata for a file system namespace for the data received from the client to the persistent memory.

5. The system of claim 1, wherein a copy of any data that is stored by the persistent memory is automatically backed up to a nonvolatile memory device which is integrated with the persistent memory, in response to detecting a power loss by the persistent memory, and the copy of the data is copied back from the nonvolatile memory device to the persistent memory, in response to detecting a power restoration by the persistent memory.

6. The system of claim 1, wherein identifying any data segment as unique relative to data segments already stored by the inline deduplication pipeline comprises the inline deduplication pipeline generating a fingerprint that corresponds to each data segment, and determining that any corresponding fingerprint lacks a match to each fingerprint that was previously created for previously received data segments.

7. The system of claim 1, wherein the plurality of instructions further causes the processor to pack the compressed data segments and metadata in corresponding segment references in the persistent memory with other compressed data segments and metadata in corresponding other segment references in the persistent memory into a container which is stored to a storage device that is external to the persistent memory.

8. A computer program product comprising a non-transitory computer-readable medium having a computer-readable program code embodied therein to be executed by one or more processors, the program code including instructions to:

identify, by a processor that executes an inline deduplication pipeline, any data segment which is created from data received with a write request from a client, and which is unique relative to data segments already stored by the inline deduplication pipeline;

log, by the processor, any segment reference of any data segment which is identified as unique into persistent memory, which has a lower write latency than any non-volatile random-access memory device that is external to the persistent memory;

log, by the processor, any of the data which is received from the client and which is yet to be anchored into any data segment, into the persistent memory;

compress, by a hardware accelerator that has a lower compression latency than the processor, any data segment which is identified as unique;

store, by the hardware accelerator, any compressed data segments into the persistent memory; and enable the client to provide additional data by the processor acknowledging to the client that the data received from the client is stable in the persistent memory.

9. The computer program product of claim 8, wherein the program code includes further instructions to acknowledge that the write request has been received with the data, in response to receiving the write request with the data from the client.

10. The computer program product of claim 8, wherein the program code includes further instructions to identify multiple anchor boundaries within the data, and anchor the data at the multiple anchor boundaries, thereby creating multiple data segments, in response to receiving the data from the client.

11. The computer program product of claim 8, wherein program code includes further instructions to log metadata for a file system namespace for the data received from the client to the persistent memory.

12. The computer program product of claim 8, wherein a copy of any data that is stored by the persistent memory is automatically backed up to a nonvolatile memory device which is integrated with the persistent memory, in response to detecting a power loss by the persistent memory, and the copy of the data is copied back from the nonvolatile memory device to the persistent memory, in response to detecting a power restoration by the persistent memory.

13. The computer program product of claim 8, wherein identifying any data segment as unique relative to data segments already stored by the inline deduplication pipeline comprises the inline deduplication pipeline generating a fingerprint that corresponds to each data segment, and determining that any corresponding fingerprint lacks a match to each fingerprint that was previously created for previously received data segments.

14. The computer program product of claim 8, wherein the program code includes further instructions to pack the compressed data segments and metadata in corresponding segment references in the persistent memory with other compressed data segments and metadata in corresponding other segment references in the persistent memory into a container which is stored to a storage device that is external to the persistent memory.

15. A computer-implemented method for a low-latency hardware accelerator and persistent memory for inline deduplication systems, comprising:

identifying, by a processor that executes an inline deduplication pipeline, any data segment which is created from data received with a write request from a client, and which is unique relative to data segments already stored by the inline deduplication pipeline;

logging, by the processor, any segment reference of any data segment which is identified as unique into persistent memory, which has a lower write latency than any non-volatile random-access memory device that is external to the persistent memory;

logging, by the processor, any of the data which is received from the client and which is yet to be anchored into any data segment, into the persistent memory;

compressing, by a hardware accelerator that has a lower compression latency than the processor, any data segment which is identified as unique;

storing, by the hardware accelerator, any compressed data segments into the persistent memory; and enabling the client to provide additional data by the processor acknowledging to the client that the data received from the client is stable in the persistent memory.

16. The computer-implemented method of claim 15, wherein the computer-implemented method further comprises acknowledging that the write request has been received with the data, identifying multiple anchor boundaries within the data, and anchoring the data at the multiple anchor boundaries, thereby creating multiple data segments, in response to receiving the write request with the data from the client.

17. The computer-implemented method of claim 15, wherein the computer-implemented method further comprises logging metadata for a file system namespace for the data received from the client to the persistent memory.

18. The computer-implemented method of claim 15, wherein a copy of any data that is stored by the persistent memory is automatically backed up to a nonvolatile memory device which is integrated with the persistent memory, in response to detecting a power loss by the persistent memory, and the copy of the data is copied back from the nonvolatile memory device to the persistent memory, in response to detecting a power restoration by the persistent memory.

19. The computer-implemented method of claim 15, wherein identifying any data segment as unique relative to data segments already stored by the inline deduplication pipeline comprises the inline deduplication pipeline generating a fingerprint that corresponds to each data segment, and determining that any corresponding fingerprint lacks a match to each fingerprint that was previously created for previously received data segments.

20. The computer-implemented method of claim 15, wherein the computer-implemented method further comprises packing the compressed data segments and metadata in corresponding segment references in the persistent memory with other compressed data segments and metadata in corresponding other segment references in the persistent memory into a container which is stored to a storage device that is external to the persistent memory.

* * * * *